UNITED STATES PATENT OFFICE.

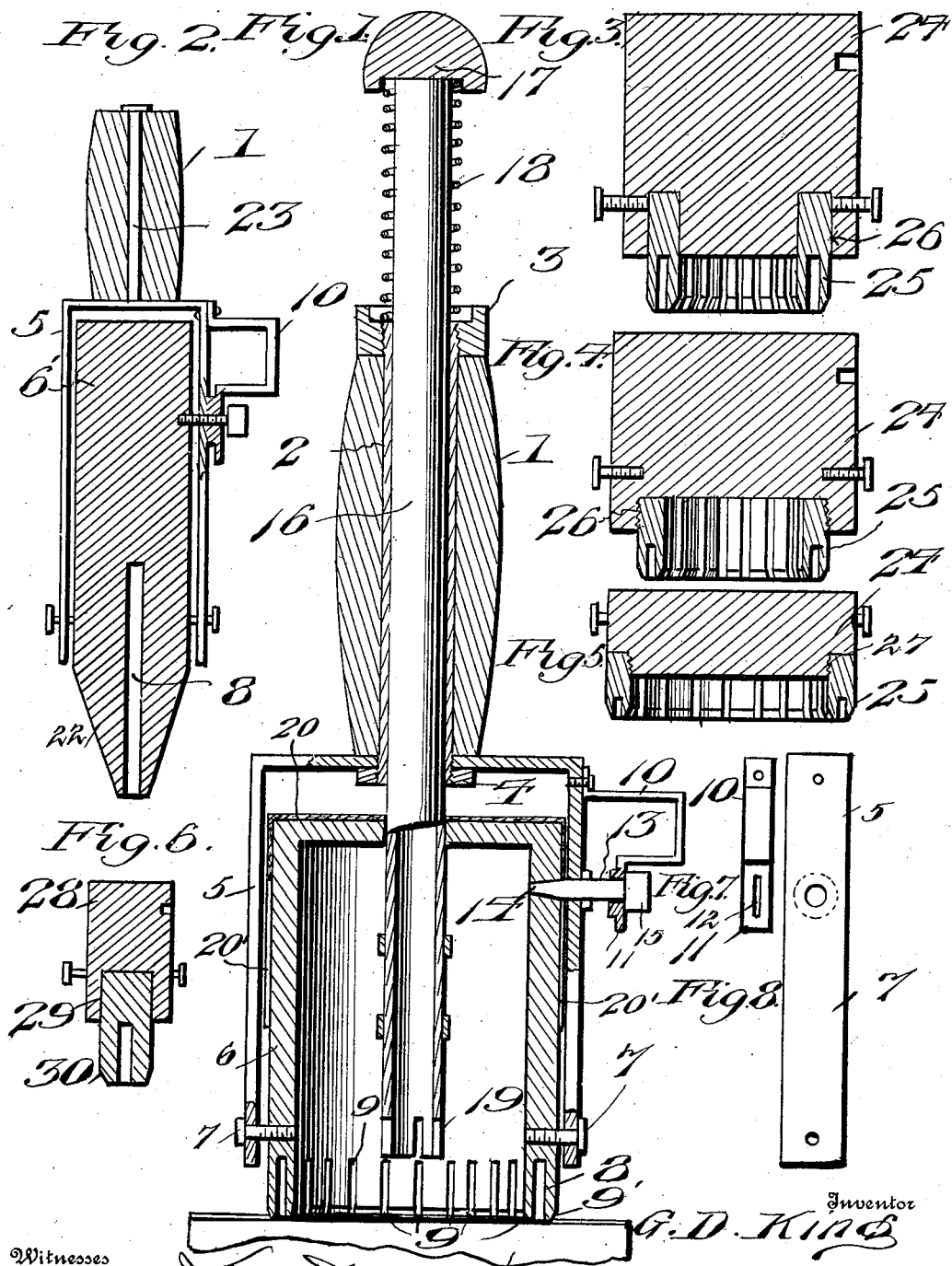

GARRY D. KING, OF CUSSETA, GEORGIA.

SOLDERING-IRON.

No. 861,035.    Specification of Letters Patent.    Patented July 23, 1907.

Application filed August 5, 1905. Serial No. 272,863.

*To all whom it may concern:*

Be it known that I, GARRY D. KING, a citizen of the United States, residing at Cusseta, in the county of Chattahoochee and State of Georgia, have invented new and useful Improvements in Soldering-Irons, of which the following is a specification.

This invention relates to soldering irons designed especially for use in capping fruit cans, and has for its object to produce a comparatively simple, inexpensive device of this character, in which the solder will be applied wholly around the margin of the cap at a single operation, one wherein the soldering head may be readily moved to inactive position after the soldering operation, and one in which the sliding rod or element on which the head moves serves to hold the cap in position while raising the head.

Further objects of the invention are to provide a device of this character in which the soldering head is adapted to retain a comparatively large quantity of solder, one in which the head may be readily reversed for purposes of heating, thus obviating injury to the tinned end of the head, one wherein the head may be securely locked in active position, and one in which the radiation of heat from the iron is measurably decreased and the hand of the operator protected from the heat radiated.

With these and other objects in view the invention comprises the novel features of construction and combination of parts more fully hereinafter described.

In the accompanying drawings: Figure 1 is a central longitudinal section through an iron embodying the invention and showing the same in position on a can. Fig. 2 is a similar view showing a slightly different embodiment of the invention. Figs. 3, 4, 5 and 6 are detail sectional views showing modified forms of soldering heads. Fig. 7 is a detail view in elevation of the latch carrying member or spring. Fig. 8 is a side elevation of the head supporting member or frame.

Referring to the drawings and particularly to Fig. 1, 1 designates a handle composed of wood or other appropriate material secured upon a tubular metal core 2 through the medium of retaining nuts 3 and 4 threaded onto the ends of the core, there being fixed on the normally lower end of the latter and by means of the nut 4 a substantially U-shaped member or frame 5 having arranged therein a tubular soldering head 6 composed of copper or other suitable material and pivotally secured in the frame by means of diametrically opposed pivoting members or screws 7 loosely journaled in the arms of the frame at points adjacent their lower ends and in threaded engagement with the head 6, the normally lower active end of which latter is provided with a vertical, downwardly opening solder receiving channel 8 extended continuously and wholly around the perimeter of the active end of the head, which is also provided with transverse openings or slots 9 formed through the inner wall of and arranged to communicate with the channel, the channeled end of the head being tinned as usual to hold the solder and having the lower edges of its inner and outer walls beveled as at 9′ toward the mouth of the channel, which is of a width to straddle the seam to be soldered.

Attached to one of the side arms of the frame is a substantially U-shaped retaining member or spring 10 having a depending portion or arm 11 provided with a longitudinal slot 12 which receives a locking member or pin 13 entered through an opening in the frame bar and adapted for engagement at its inner end with an opening or seat 14 formed in the adjacent wall of the head 6 for fixing the latter against movement, said pin being provided at its outer end with a head 15 to be acted upon by the spring member 10 in the operation of retracting the pin to release the head, as more fully hereinafter explained.

Arranged for longitudinal sliding movement within the core 2, which constitutes a guide, is a tubular cap holding plunger 16 equipped at its outer end with a head 17 between which and the nut 3 there is arranged a normally expanded spring 18, the lower end of the plunger, which in practice seats over the vent opening in the can cap, being provided with a plurality of longitudinal openings or slots 19 through which the air escaping from the can through the vent opening may pass.

Provided to fit upon either end of the head 6 is a protecting member or cap 20 composed of asbestos or other appropriate material and serving when applied to the normally upper end of the head to minimize radiation of the heat therefrom and to protect the hand of the operator from the action of such heat as may be radiated, said cap further serving to obviate rapid cooling of the head and when fitted on the open active end of the latter to prevent burning of the tin therefrom during the operation of heating the iron, as will be more fully hereinafter described in order to adapt the cap 20 for application to the open end of the head 6, it is provided with longitudinal slots 20′ to receive the pivoting screws 7.

In practice, supposing the parts to be in normal position, as illustrated in Fig. 1, the head 6 will be locked by the pin 13 against rotation in the frame 5, thus adapting it to be seated upon and for applying the solder to the cap of a can 21, it being understood of course that the head 6 corresponds in diameter with that of the cap whereby the beveled edge 9′ will seat in the cap-receiving groove and apply the solder wholly around the marginal edge of the cap at a single operation. After the solder has been applied for securing the cap in place, the plunger 16 is depressed against the action of spring 18, thereby bringing its lower slotted end into contact with the cap and in position over the vent opening in the latter whereby the air escaping from the can may pass freely outward through the slots 19 and the cap be maintained firmly in seated position during the action of moving the head out of contact therewith.

It is to be noted in this connection that owing to the head being recessed at 8 and provided with the slots 9 it is adapted for retaining an increased supply of solder, thus to insure perfect operation, and further that the solder will, owing to the head being beveled at 9', be properly deposited in the bottom of the cap-receiving groove, whereby the quantity of solder used is reduced to a minimum.

When it is desired to heat the head 6 the plunger 16 is withdrawn from engagement with the latter and the spring member 10 manipulated for withdrawing the locking pin 13 and releasing the head 6, whereupon the head will turn automatically by gravity upon the pivots 7 to permit introduction of the normally inner closed end of the head into the fire, thus obviating contact of the tinned end of the head with the fire and burning of the tin. In instances where it may be desired to introduce the entire head into the fire the cap 26 is seated over the active or tinned end to protect the same from the action of the fire and at the same time obviate fouling of said end by soot and the like.

In Fig. 2 the construction and operation of the parts is identical with that above described, except that the head 6' is solid and provided with a sharpened or conical active end 22, the head being provided with a central longitudinal channel 8' for holding the supply of solder. Furthermore, in this form of the device the handle 1 is fixed to the U-shaped frame 5 by means of a central rod 23 and the plunger 16 heretofore described is dispensed with.

As illustrated in Fig. 3, the soldering head comprises a solid body portion 24 and an active portion or section 25 seated and frictionally retained in a socket or recess 26 provided in the body, the section 25 in Fig. 4 being formed with external threads engaging similar threads in the socket 26, while in Fig. 5 the body 24 has a reduced externally threaded portion or neck 27 onto which is screwed the tubular portion or section 25.

Fig. 6 illustrates a modified form of the head disclosed in Fig. 2 and in this modification the body portion 28 of the head is socketed at 29 to receive and frictionally hold one end of the active portion or section 30.

From the foregoing it is apparent that I produce a comparatively simple, inexpensive device admirably adapted for the attainment of the ends in view, it being understood that minor changes in the details herein set forth may be resorted to without departing from the spirit of the invention.

Having thus described my invention, what I claim is:

1. In a device of the class described, a soldering head having a vertical, downwardly opening solder receiving channel extending continuously and wholly around the perimeter of the active end of the head, said channel being of a width to straddle the seam to be soldered and having one of its walls provided with transverse openings communicating with the interior of the channel.

2. In a device of the class described, a tubular soldering head having a vertical, downwardly opening solder receiving channel extending continuously and wholly around the perimeter of the active end of the head and having one of its walls provided with transverse openings communicating with the channel, the latter being of a width to straddle the seam to be soldered and having the lower edges of its inner and outer walls beveled downwardly at opposite sides of and toward the mouth of the channel.

3. In a device of the class described, a reversible, tubular soldering head having a vertical, downwardly opening channel extending continuously and wholly around the perimeter of its active end and provided with transverse openings communicating with said channel, the latter being of a width to straddle the seam to be soldered and having the inner and outer faces of its walls beveled at their lower edges downward and inward toward the mouth of the channel.

4. In a device of the class described, a tubular handle provided with a frame, a soldering head reversibly mounted in said frame and having a vertical, downwardly opening solder receiving channel extended wholly and continuously around the perimeter of its active end, said channel being designed to apply solder in one operation wholly around the seam of a can cap, a plunger slidably extended through the handle and having a tubular end to bear on the cap around the vent opening therein, the active end of the plunger being provided with a transverse vent opening, and means for maintaining the plunger normally in retracted position.

5. In a device of the class described, a tubular handle, a reversible, tubular soldering head carried thereby, said head having its active end provided with a vertical, downwardly opening solder receiving channel designed to apply solder in one operation wholly around the seam of a can cap, a plunger slidably mounted in the handle to project through the head and having a tubular, active end to bear on the cap around the vent opening in the latter, the tubular, active end of the plunger being provided with a transverse vent opening, and a spring for maintaining the plunger in retracted position.

6. In a device of the class described, a tubular handle, a substantially U-shaped frame carried thereby, a tubular soldering head pivoted in the frame for endwise reversal, said head being provided with a vertical, downwardly opening solder receiving channel extended continuously and wholly around its active end, a spring actuated locking member for fixing the head against movement in the frame, a cap holding plunger slidably mounted in the handle to project through the head and having a tubular, active end to bear on the cap over the vent opening therein, the active end of the plunger being provided with a transverse vent opening and a spring acting on the plunger for holding the same normally in retracted position.

In testimony whereof, I affix my signature in presence of two witnesses.

GARRY D. KING.

Witnesses:
G. D. ALLEN,
F. M. GONLY.